United States Patent
Hodatsu (10) Patent No.: US 10,246,047 B2
(45) Date of Patent: Apr. 2, 2019

(54) SEAT BELT RETRACTOR AND SEAT BELT APPARATUS

(71) Applicant: JOYSON SAFETY SYSTEMS JAPAN K.K., Tokyo (JP)

(72) Inventor: Yuichiro Hodatsu, Tokyo (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 0 days.

(21) Appl. No.: 15/137,633

(22) Filed: Apr. 25, 2016

(65) Prior Publication Data

US 2016/0318474 A1 Nov. 3, 2016

(30) Foreign Application Priority Data

Apr. 28, 2015 (JP) ................................. 2015-091143

(51) Int. Cl.
*B60R 22/34* (2006.01)
*B60R 22/38* (2006.01)
*B60R 22/48* (2006.01)

(52) U.S. Cl.
CPC .............. *B60R 22/34* (2013.01); *B60R 22/38* (2013.01); *B60R 2022/3402* (2013.01); *B60R 2022/4808* (2013.01)

(58) Field of Classification Search
CPC . B60R 22/34; B60R 22/38; B60R 2022/3402; B60R 2022/4808
See application file for complete search history.

(56) References Cited

U.S. PATENT DOCUMENTS 6,676,058 B2 1/2004 Nagata et al.
6,834,821 B2 12/2004 Nagata et al.
(Continued)

FOREIGN PATENT DOCUMENTS

| JP | 2000-302007 A | 10/2000 |
|---|---|---|
| JP | 2003-137065 A | 5/2003 |
| JP | 2014-080121 A | 5/2014 |

OTHER PUBLICATIONS

European Patent Office, "Communication Pursuant to Article 94(3) EPC," issued in connection with European Patent Application No. 16 167 352.0, dated Oct. 10, 2017.
(Continued)

*Primary Examiner* — Barry Gooden, Jr.
(74) *Attorney, Agent, or Firm* — Foley & Lardner LLP (57) ABSTRACT

To provide a seat belt retractor and a seat belt apparatus in which contact between a locking base and a base frame can be suppressed. A seat belt retractor includes a spool 2 that retracts a webbing restraining an occupant, a base frame 3 that accommodates the spool 2 while allowing the spool 2 to rotate, and a lock mechanism 4 regulating rotation of the spool 2. The lock mechanism 4 includes a locking base 41 disposed at an end portion of the spool 2, an opening 31 that is formed in the base frame 3 and allows the locking base 41 to be inserted therethrough, engagement teeth 32 formed at an inner edge of the opening 31, and a pawl 42 that is disposed radially outwardly movable relative to the locking base 41 and engageable with the engagement teeth 32. The lock mechanism 4 further includes a protect cover 43 that is attached to the locking base 41 and includes a side wall portion 43b disposed along a side surface portion of the locking base 41.

6 Claims, 5 Drawing Sheets

(56) References Cited

U.S. PATENT DOCUMENTS

| | | | |
|---|---|---|---|
| 9,428,146 B2* | 8/2016 | Osada | B60R 22/40 |
| 2011/0290930 A1* | 12/2011 | Tatsuma | B60R 22/38 |
| | | | 242/383.2 |
| 2011/0315805 A1* | 12/2011 | Yanagawa | B60R 22/38 |
| | | | 242/382 |
| 2013/0221148 A1 | 8/2013 | Fasching | |
| 2013/0327874 A1* | 12/2013 | Jessup | B60R 22/34 |
| | | | 242/379 |
| 2014/0131501 A1* | 5/2014 | Michel | B60R 22/38 |
| | | | 242/382.1 |
| 2014/0305203 A1* | 10/2014 | Baumgartner | B60R 22/40 |
| | | | 73/431 |
| 2015/0360642 A1* | 12/2015 | Lee | B60R 22/405 |
| | | | 242/383.2 |
| 2016/0016535 A1* | 1/2016 | Kielwein | B60R 22/3413 |
| | | | 242/379 |
| 2016/0288768 A1* | 10/2016 | Hodatsu | B60R 22/40 |
| 2016/0347274 A1* | 12/2016 | Fukuta | B60R 22/34 |
| 2016/0347275 A1* | 12/2016 | Hodatsu | B60R 22/34 |
| 2017/0129450 A1* | 5/2017 | Suga | B60R 22/34 |

OTHER PUBLICATIONS

European Patent Office, "Communication with Extended European Search Report," issued in connection with European Patent Application No. 16 167 352.0, dated Aug. 29, 2016.

* cited by examiner

SEAT BELT RETRACTOR AND SEAT BELT APPARATUS

FIELD OF THE INVENTION

The present invention relates to a seat belt retractor and a seat belt apparatus, and in particular, relates to a seat belt retractor that includes a lock mechanism engageable with a base plate and a seat belt apparatus that includes the seat belt retractor.

BACKGROUND OF THE INVENTION

Vehicles such as automobiles generally include seat belt apparatuses that restrain an occupant in a seat that includes a seat portion in which the occupant sits and a backrest portion positioned back of the occupant. Such a seat belt apparatus includes a webbing that restrains the occupant, a seat belt retractor that retracts the webbing, a guide anchor that is disposed on a vehicle body side and guides the webbing, a belt anchor that fixes the webbing to the vehicle body side, a buckle disposed on a side surface of a seat, and a tongue disposed on the webbing. The tongue is fitted into the buckle so as to restrain the occupant with the webbing.

Such a seat belt retractor in many cases includes a spool that retracts a webbing, a base frame that accommodates the spool while allowing the spool to rotate, a spring unit that applies a retracting force to the spool, a vehicle sensor that detects rapid deceleration of the vehicle, a lock mechanism that is activated by the vehicle sensor and that causes the spool to be engaged with the base frame, and a pretensioner that removes the slack of the webbing in case of emergency such as a collision of the vehicle in accordance with a signal from the vehicle (see, for example, Japanese Unexamined Patent Application Publication No. 2014-80121 and Japanese Unexamined Patent Application Publication No. 2000-302007).

SUMMARY OF THE INVENTION

Lock mechanisms as described above include in many cases, for example, as described in Japanese Unexamined Patent Application Publication No. 2000-302007, a lock base (also referred to as a locking base) connected to an end portion of a spool, a lock plate (also referred to as a pawl) disposed outwardly movable in a radial direction relative to the lock base, and lock teeth (also referred to as engagement teeth) formed at an inner edge of an opening formed in the base frame. Furthermore, as described in Japanese Unexamined Patent Application Publication No. 2000-302007, a lock plate cover may be disposed such that the lock plate is interposed between the lock base and the lock plate cover. By disposing this lock plate cover, up lift of the lock plate and entrance of dust and the like can be prevented.

The lock plate (pawl) that engages with the lock teeth (engagement teeth) of the base frame is disposed in the lock base (locking base) connected to the end portion of the spool. At normal time (non-locked state), a certain gap is formed between the lock base (locking base) and the lock teeth (engagement teeth) so as not to obstruct rotation of the spool.

However, when a high load is generated in the webbing or the pretensioner is activated, the spool may be moved relative to the base frame and decentered. At this time, there is a problem in that a side surface portion of the lock base (locking base) is brought into contact with the lock teeth (engagement teeth), thereby increasing resistance when the pretensioner is activated.

The present invention is made in view of the above-described problem, and an object of the present invention is to provide a seat belt retractor and a seat belt apparatus in which contact between a locking base and a base frame can be suppressed.

The present invention provides a seat belt retractor that includes a spool that retracts a webbing that restrains an occupant, a base frame that accommodates the spool while allowing the spool to rotate, and a lock mechanism that regulates rotation of the spool. In the seat belt retractor, the lock mechanism includes a locking base disposed at an end portion of the spool, an opening formed in the base frame and through which the locking base is inserted, engagement teeth formed at an inner edge of the opening, and a pawl that is disposed outwardly movable in a radial direction relative to the locking base and is engageable with the engagement teeth. The lock mechanism further includes a protect cover that includes a side wall portion disposed at least along a side surface portion of the locking base.

The present invention provides a seat belt apparatus that includes a webbing that restrains an occupant, a seat belt retractor that retracts the webbing, a guide anchor that is disposed on a vehicle body side and guides the webbing, a belt anchor that fixes the webbing to the vehicle body side, a buckle that is disposed on a side surface of a seat in which the occupant sits, and a tongue disposed in the webbing. In the seat belt apparatus, the seat belt retractor includes a spool that retracts the webbing, a base frame that accommodates the spool while allowing the spool to rotate, and a lock mechanism that regulates rotation of the spool. The lock mechanism includes a locking base that is disposed at an end portion of the spool, an opening that is formed in the base frame and through which the locking base is inserted, engagement teeth that are formed at an inner edge of the opening, and a pawl disposed outwardly movable in a radial direction relative to the locking base and is engageable with the engagement teeth. The lock mechanism further includes a protect cover that includes a side wall portion disposed at least along a side surface portion of the locking base.

In the above-described seat belt retractor and the seat belt apparatus according to the present invention, the protect cover may have a cut where the side wall portion is not disposed over a movable region of the pawl. Furthermore, the protect cover may include a ceiling portion disposed on a surface of the locking base. The side wall portion may be formed along an outer circumference of the ceiling portion. Furthermore, the ceiling portion may have a securing hole that allows a projection formed on the locking base to be inserted therethrough. Furthermore, the protect cover may be formed of metal. Furthermore, the locking base may have a circular groove that allows a distal end of the side wall portion to be accommodated therein.

In the above-described seat belt retractor and the seat belt apparatus according to the present invention, the protect cover that includes the side wall portion disposed along the side surface portion of the locking base is disposed. Thus, even when the spool is moved relative to the base frame due to generation of a high load in the webbing or activation of the pretensioner, the side wall portion of the protect cover is brought into contact with the engagement teeth of the base frame. This can suppress contact between the locking base and the base frame. Accordingly, by using the seat belt retractor and the seat belt apparatus according to the present invention, resistance caused when the pretensioner is activated can be reduced, and accordingly, the pretensioner can be smoothly activated.

BRIEF DESCRIPTION OF THE DRAWINGS

FIGS. 3A and 3B are explanatory views illustrating a protect cover illustrated in FIG. 1, where

FIGS. 4A and 4B are explanatory views illustrating operation of the seat belt retractor illustrated in FIG. 1, where

DETAILED DESCRIPTION OF THE PREFERRED EMBODIMENTS

Figure 1:
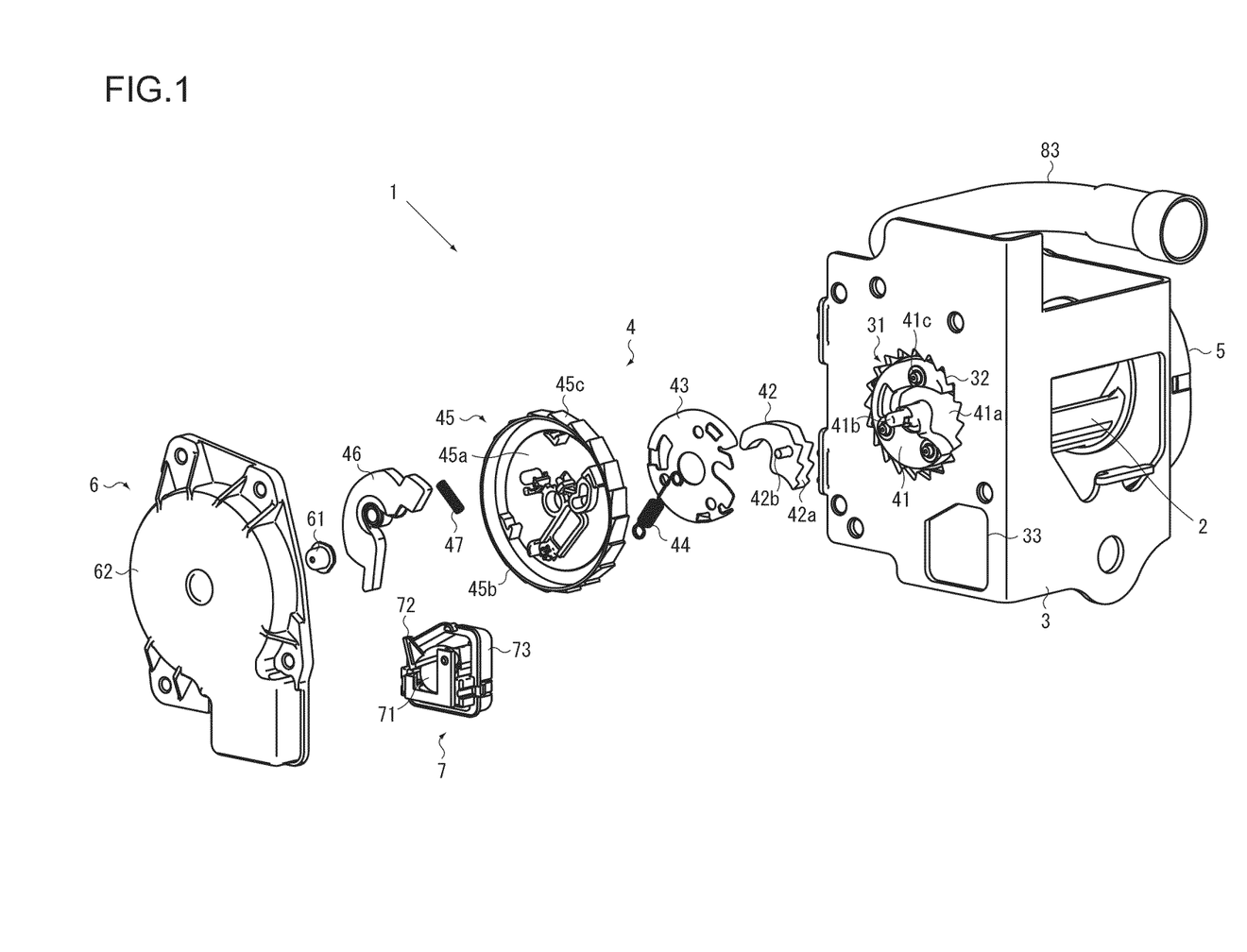
FIG. 1 is an exploded view of a seat belt retractor according to an embodiment of the present invention.
Figure 2:
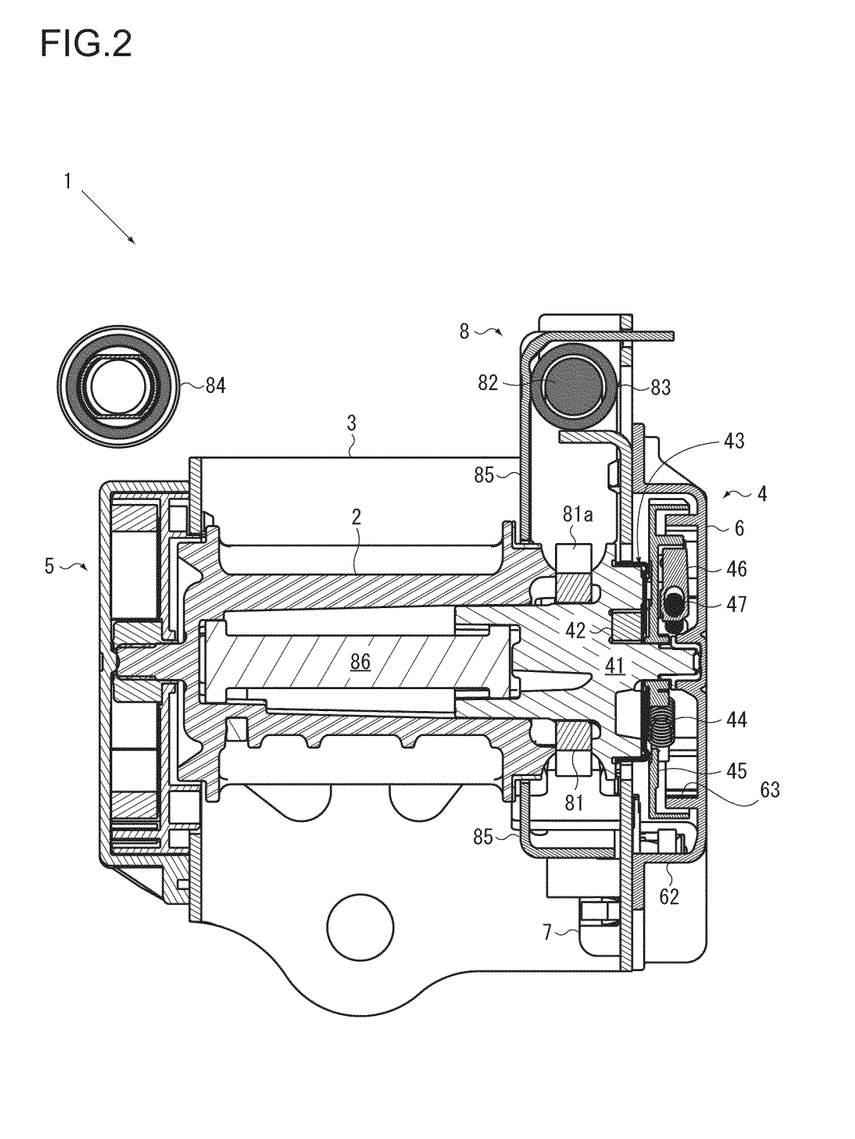
FIG. 2 is a sectional view of the seat belt retractor illustrated in FIG. 1.
Figure 3A:
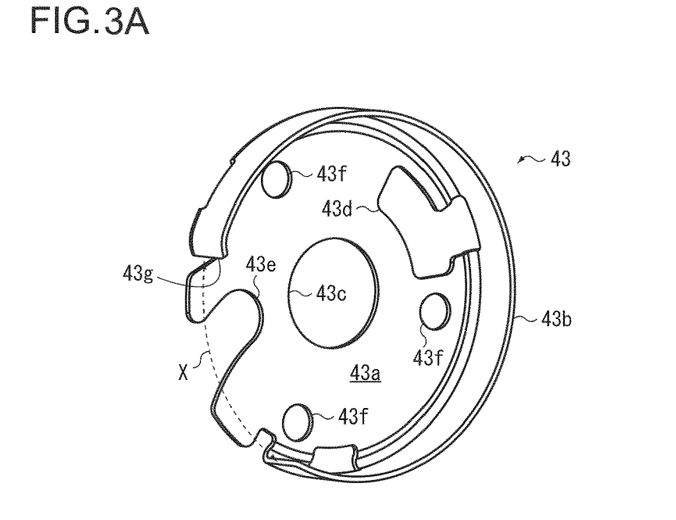
FIG. 3A is a perspective view and FIG. 3B is a sectional view of an assembled state.
Figure 3B:
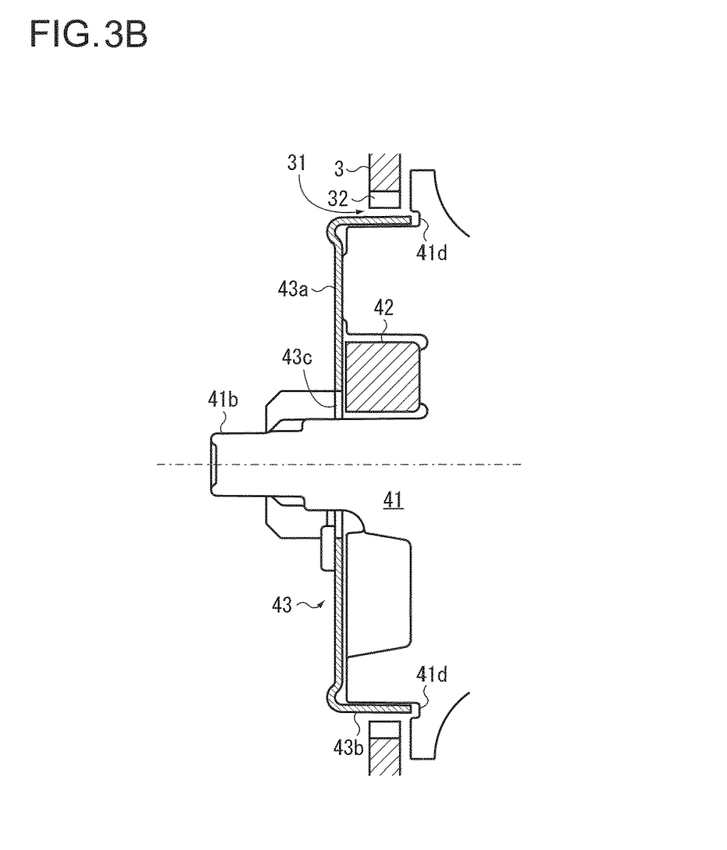
Figure 4A:
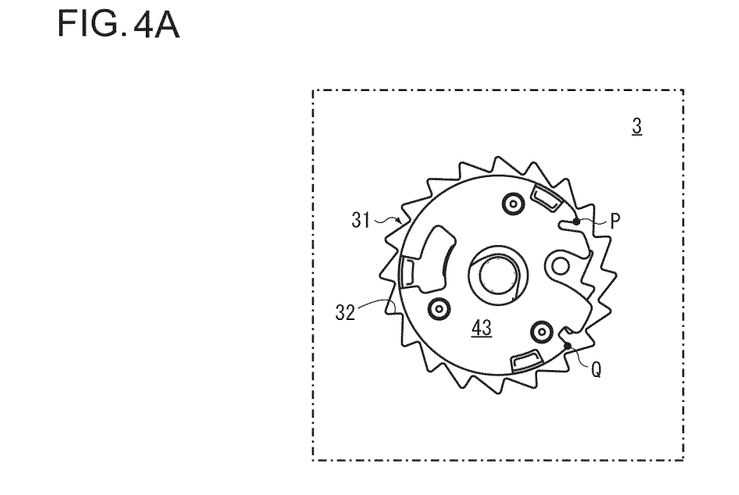
FIG. 4A illustrates a normal state and FIG. 4B illustrates a decentered state.
Figure 4B:
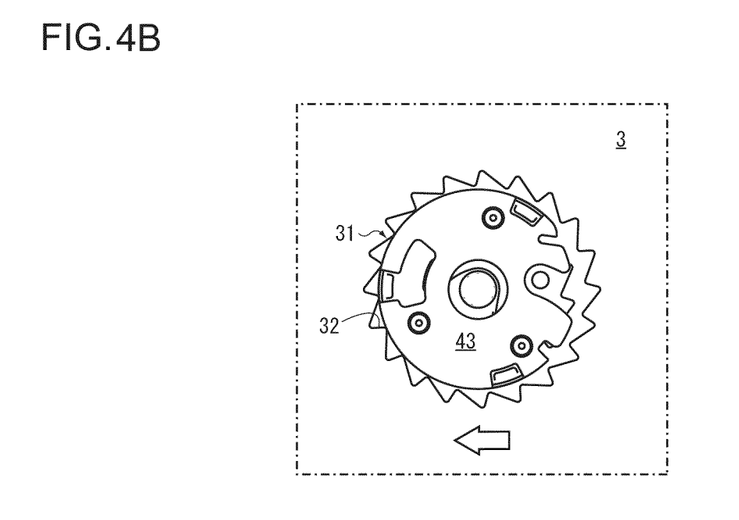

An embodiment of the present invention will be described below with reference to FIGS. 1 to 5. Here, FIG. 1 is an exploded view of a seat belt retractor according to the embodiment of the present invention. FIG. 2 is a sectional view of the seat belt retractor illustrated in FIG. 1. FIGS. 3A and 3B are explanatory views illustrating a protect cover illustrated in FIG. 1, where FIG. 3A is a perspective view and FIG. 3B is a sectional view of an assembled state. FIGS. 4A and 4B are explanatory views illustrating operation of the seat belt retractor illustrated in FIG. 1, where FIG. 4A illustrates a normal state and FIG. 4B illustrates a decentered state. It should be noted that illustration of the webbing is omitted from FIGS. 1 and 2 for convenience of description.

As illustrated in FIGS. 1 and 2, a seat belt retractor 1 according the embodiment of the present invention includes a spool 2 that retracts a webbing that restrains an occupant, a base frame 3 that accommodates the spool 2 while allowing the spool 2 to rotate, and a lock mechanism 4 that regulates rotation of the spool 2. The lock mechanism 4 includes a locking base 41 that is disposed at an end portion of the spool 2, an opening 31 formed in the base frame 3 and through which the locking base 41 is inserted, engagement teeth 32 that are formed at an inner edge of the opening 31, and a pawl 42 that is disposed outwardly movable in a radial direction relative to the locking base 41 and engageable with the engagement teeth 32. The lock mechanism 4 further includes a protect cover 43 that is attached to the locking base 41 and includes a side wall portion 43b disposed along a side surface portion of the locking base 41.

The spool 2 is a retracting drum that retracts the webbing. For example, the spool 2 has one end rotatably supported by a spring unit 5 and the other end connected to the locking base 41 that is rotatably supported by a retainer cover 6 through a cap 61. The spring unit 5 is a part urges the spool 2 in a retracting direction and includes a spiral spring. The retainer cover 6 is a part accommodates the lock mechanism 4 and a vehicle sensor 7. The spring unit 5 and the retainer cover 6 are directly or indirectly fixed to the base frame 3.

The base frame 3 is, for example, a frame structure that has a substantially squared U shape section and has a wall member serving as a rear surface while including a pair of wall members serving as side surfaces formed at both ends of the wall member. The opening 31, through which the spool 2 is inserted, is formed in one of the pair of wall members serving as the side surfaces. Furthermore, a tie plate serving as a front surface may be connected to distal ends of the pair of wall members serving as the side surfaces. As illustrated in FIG. 1, the engagement teeth 32 are formed at the inner edge of the opening 31.

An opening 33, in which the vehicle sensor 7 is retained, may be formed in a side surface portion of the base frame 3. The vehicle sensor 7 includes, for example, a spherical mass body 71, a sensor lever 72 that is made swung due to a movement of the mass body 71, and a sensor cover 73 that contains the mass body 71 and the sensor lever 72 and that is retained in the opening 33. In such a vehicle sensor 7, when a vehicle body is decelerated or inclined by a specified value or more, balance of the mass body 71 is lost, and as a result, the sensor lever 72 is pushed upward. This causes a tip of the sensor lever 72 to be engaged with a lock gear 45, and accordingly, rotation of the lock gear 45 is regulated.

The lock mechanism 4 includes, for example, the locking base 41 that is connected to the end portion of the spool 2, the pawl 42 that is swingably or slidably disposed to the locking base 41, the protect cover 43 that protects the locking base 41, a pawl spring 44 that urges the pawl 42 inward in the radial direction, the lock gear 45 that is disposed relative rotatable to the locking base 41, a flywheel 46 that is swingably disposed to the lock gear 45, and a hook spring 47 that urges a tip of the flywheel 46 inward in the radial direction.

For example, the pawl 42 includes an engagement portion 42a which is engageable with the engagement teeth 32 of the base frame 3 at a tip thereof, and the entire pawl 42 has a substantially arc shape. A pin 42b that retains the pawl spring 44 is erected on a surface of the pawl 42. At normal time, the pawl 42 is accommodated in a groove 41a formed in a surface of the locking base 41 and held by the pawl spring 44 such that the engagement portion 42a does not project outward in the radial direction beyond an outer circumference of the locking base 41.

When the spool 2 and the locking base 41 are rotated relative to each other, the pawl 42 slides outward in the radial direction along the groove 41a, thereby bringing the engagement portion 42a into engagement with the engagement teeth 32 formed on the base frame 3.

The lock gear 45 includes a disc portion 45a disposed so as to face the locking base 41 and an outer circumferential wall 45b that stands erect along an outer edge of the disc portion 45a so as to face the outside. Engagement teeth 45c engageable with the sensor lever 72 of the vehicle sensor 7 are formed on an outer surface of the outer circumferential wall 45b.

The retainer cover 6 includes a substantially cylindrical projection 62 that covers an outer circumference of the outer circumferential wall 45b of the lock gear 45. Inside the projection 62 an inner circumferential wall 63 (see FIG. 2) that is disposed inside the outer circumferential wall 45b of the lock gear 45 is formed. Accordingly, when combined with the lock mechanism 4, the outer circumferential wall 45b of the lock gear 45 is inserted into a space between the inner circumferential wall 63 and the projection 62 and the flywheel 46 is disposed inside the inner circumferential wall 63. A claw engageable with the tip of the flywheel 46 is formed on an inner surface of the inner circumferential wall 63.

In such a lock mechanism 4, the locking base 41 and the lock gear 45 are rotated together along with rotation of the spool 2 at the normal time (acceleration speed of withdrawal of the webbing is a specified threshold value or less). Thus, since the spool 2 (locking base 41) and the lock gear 45 are not rotated relative to each other at the normal time, the pawl 42 is maintained in a state in which the pawl 42 is retracted to a position where the pawl 42 does not interfere with the engagement teeth 32 of the base frame 3.

When the webbing is faster than a normal acceleration speed of withdrawal, that is, the acceleration speed of withdrawal of the webbing exceeds the specified threshold value, the flywheel 46 swings and engages with the claw (not illustrated) of the retainer cover 6, and accordingly, the rotation of the lock gear 45 is regulated. Furthermore, also when the vehicle sensor 7 is activated, the tip of the sensor lever 72 engages with the engagement teeth 45c formed on the outer surface of the outer circumferential wall 45b of the lock gear 45, and accordingly, the rotation of the lock gear 45 is regulated.

When the rotation of the lock gear 45 is regulated as described above, the spool 2 (locking base 41) and the lock gear 45 are rotated relative to each other, and the pawl 42 slides along the groove 41a along with this relative rotation, thereby causing the engagement portion 42a at the tip of the pawl 42 to approach and to be engaged with the engagement teeth 32 formed at the inner edge of the opening 31 of the base frame 3. As a result, the rotation of the locking base 41 (spool 2) is regulated, and accordingly, the withdrawal of the webbing is regulated.

The seat belt retractor 1 may further include a pretensioner 8 that eliminates slack in the webbing in an emergency such as a vehicle collision. As illustrated in FIG. 2, the pretensioner 8 includes, for example, a ring gear 81 that is coaxially connected to the spool 2 and includes a plurality of engagement teeth 81a formed on its outer circumference, a power transmission member 82 that is engaged with the engagement teeth 81a so as to rotate the ring gear 81, a pipe 83 that accommodates the power transmission member 82 at the normal time and ejects the power transmission member 82 in an emergency, a gas generator 84 that generates gas in an emergency so as to transmit power to the power transmission member 82, and a cover member 85 that is disposed inside the base frame 3 and accommodates the ejected power transmission member 82.

The ring gear 81 may be connected to the spool 2 through a torsion bar 86 that twists when subjected to a load equal to or more than a specified threshold value so as to absorb a shock. The power transmission member 82 may be a metal ball or a resin rod. The structure of the pretensioner 8 is not limited to that illustrated in FIG. 2. Any related-art pretensioner may be selected and used. Furthermore, disposition of the pretensioner 8 is not limited to that illustrated in FIG. 2. The pretensioner 8 may be disposed at a position that is outside the base frame 3 and adjacent to the locking base 41, or the pretensioner 8 may be disposed inside the spring unit 5.

As has been described, the spool 2 is inserted through the opening 31 of the base frame 3, and a gap is formed between the locking base 41 and the opening 31 of the base frame 3. Since the structure of a shaft unit including the spool 2 is flexible relative to the base frame 3 having a stiff structure, the spool 2 may be moved relative to the base frame 3 and decentered when the webbing is strongly pulled in a withdrawal direction. The spool 2 may also be moved relative to the base frame 3 and decentered when a reactive force is produced in the spool 2 due to activation of the pretensioner 8.

At this time, the side surface portion of the locking base 41 may be brought into contact with the engagement teeth 32 of the base frame 3. Thus, according to the present embodiment, the metal protect cover 43 that can protect at least the side surface portion of the locking base 41 is used. The protect cover 43 includes, for example, a ceiling portion 43a disposed on the surface of the locking base 41 and the side wall portion 43b disposed along the side surface portion of the locking base 41 as illustrated in FIG. 3A.

The ceiling portion 43a is a portion regulates a movement of the pawl 42 in the axial direction. Furthermore, the ceiling portion 43a has a shaft portion insertion hole 43c through which a shaft portion 41b of the locking base 41 is inserted. The ceiling portion 43a may also have an opening 43d and a cut 43e. The opening 43d allows the lock gear 45 and the locking base 41 to access to each other. The lock gear 45 and the locking base 41 are disposed with the ceiling portion 43a interposed therebetween. The cut 43e allows the lock gear 45 and the pawl 42 to access to each other.

Furthermore, the protect cover 43 may have three securing holes 43f formed in its ceiling portion 43a that allow three projections 41c (see FIG. 1) formed on the surface of the locking base 41 to be inserted therethrough. By engagement of the projections 41c with the securing holes 43f, the relative rotation between the protect cover 43 and the locking base 41 is regulated.

According to the present embodiment, a case where three pairs of the projection 41c and the securing hole 43f are disposed is illustrated, however, the number of pairs is not limited to this. It is sufficient if a plurality of pairs of the projection 41c and the securing hole 43f (that is, two or more pairs) be disposed.

The side wall portion 43b is, for example, as illustrated in FIG. 3A, formed to have a substantially arc shape along an outer circumference of the ceiling portion 43a. In this state, the height of the side wall portion 43b is set to, for example, as illustrated in FIG. 3B, a height with which the side surface portion of the locking base 41 can be sufficiently covered. A circular groove 41d may be formed in a surface of the locking base 41 so as to allow a distal end of the side wall portion 43b to be accommodated therein. Forming the circular groove 41d makes it possible to lap the protect cover 43 over the locking base 41. Thus, the side surface portion of the locking base 41 can be further effectively protected.

Furthermore, as described above, the pawl 42 is moved out or moved in through the side surface portion of the locking base 41. Thus, interference between the pawl 42 and the side wall portion 43b needs to be prevented. In order to address this, the protect cover 43 has a cut 43g where the side wall portion 43b is not disposed over a movable region X of the pawl 42. Specifically, referring to FIG. 3A, a range indicated by a double-headed dotted arrow corresponds to the movable region X of the pawl 42, and the side wall portion 43b is not formed in this part. Conversely, in order to suppress the contact between the locking base 41 and the engagement teeth 32, it is preferable that the side wall portion 43b be formed throughout part other than this movable region X of the pawl 42.

The specific structure of the protect cover 43 is not limited to that illustrated in, for example, FIG. 3A. It is sufficient that the protect cover 43 at least protects the side surface portion of the locking base 41 from being contacted with the engagement teeth 32. Other than this, the structure of the protect cover 43 may be appropriately changed in accordance with the shapes or the like of the locking base 41 and the pawl 42. For example, the side wall portion 43b may be formed as a component separated from the ceiling portion 43a.

Next, operation of the above-described protect cover 43 is described with reference to FIGS. 4A and 4B. Referring to FIG. 4A, it is assumed that the side wall portion 43b is formed in a long arc portion from a point P to a point Q. At the normal time, the axes of the opening 31 having the engagement teeth 32 and the spool 2 (locking base 41) are substantially aligned with each other, and the side wall portion 43b of the protect cover 43 and the engagement teeth 32 are maintained in a state in which the protect cover 43 and the engagement teeth 32 are not in contact with each other with the gap of a certain size formed therebetween as illustrated in FIG. 4A.

When the webbing is strongly pulled in the withdrawal direction or the pretensioner 8 is activated, the spool 2 (locking base 41) is moved, for example, in a direction indicated by a blank arrow illustrated in FIG. 4B (leftward in FIG. 4B) and decentered. At this time, the gap between the side wall portion 43b of the protect cover 43 and the engagement teeth 32 is eliminated, and accordingly, the side wall portion 43b and the engagement teeth 32 are brought into contact with each other.

In general, base frames such as a base frame 3 are in many cases formed of metal. Thus, with the protect cover 43 formed of metal, damage to the side wall portion 43b can be suppressed and the spool 2 (locking base 41) can be smoothly rotated even when the side wall portion 43b and the engagement teeth 32 are brought into contact with each other. The protect cover 43 is not necessarily formed of metal. The protect cover 43 may be formed of resin as long as this resin has strength equal to the raw material of the base frame 3.

The protect cover 43 that includes the side wall portion 43b disposed along the side surface portion of the locking base 41 is disposed in the seat belt retractor 1 according to the above-described present embodiment. Thus, even when the spool 2 is moved relative to the base frame 3 due to generation of a high load in the webbing or the activation of the pretensioner 8, the side wall portion 43b of the protect cover 43 is brought into contact with the engagement teeth 32 of the base frame 3. This can suppress contact between the locking base 41 and the base frame 3. Thus, by using the seat belt retractor 1 according to the present embodiment, resistance caused when the pretensioner 8 is activated can be reduced, and accordingly, the pretensioner 8 can be smoothly activated.

Figure 5:
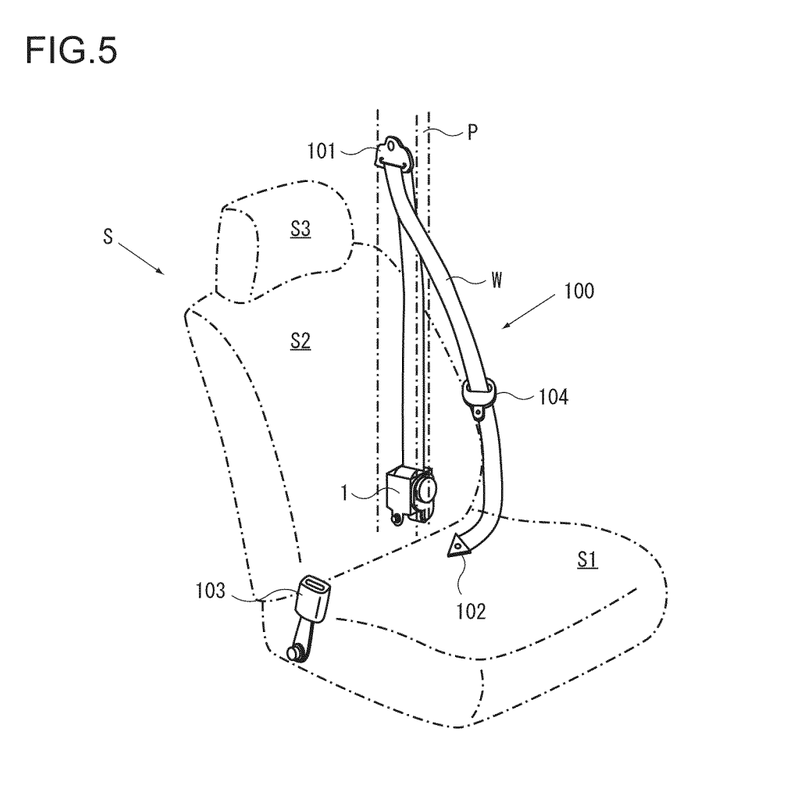
FIG. 5 illustrates an overall structure of a seat belt apparatus according to the embodiment of the present invention.

Next, a seat belt apparatus according to the embodiment of the present invention is described below with reference to FIG. 5. Here, FIG. 5 illustrates an overall structure of a seat belt apparatus according to the embodiment of the present invention. It is noted that, for convenience of description, components other than the seat belt apparatus are indicated by dotted-chain lines in FIG. 5.

A seat belt apparatus 100 according to the present embodiment illustrated in FIG. 5 includes webbing W that restrains the occupant, the seat belt retractor 1 that retracts the webbing W, a guide anchor 101 that is disposed on the vehicle body side and guides the webbing W, a belt anchor 102 that fixes the webbing W to the vehicle body side, a buckle 103 that is disposed on a side surface of a seat S in which the occupant sits, and a tongue 104 that is disposed in the webbing W. The seat belt retractor 1 has the structure illustrated in, for example, FIG. 1 to FIG. 3B.

Components other than the seat belt retractor 1 are briefly described below. The seat S includes, for example, a seat portion S1 in which the occupant sits, a backrest portion S2 positioned back of the occupant, and a headrest portion S3 that supports the head of the occupant. The seat belt retractor 1 is disposed, for example, in a B-pillar P of the vehicle body.

In general, buckles such as a buckle 103 are in many cases disposed on a side surface of the seat portion S1, and belt anchors such as a belt anchor 102 is in many cases disposed on a lower surface of the seat portion S1. Furthermore, guide anchors such as a guide anchor 101 are in many cases disposed at the B-pillar P. One end of the webbing W is connected to the belt anchor 102, and the other end of the webbing W is connected to the seat belt retractor 1 through the guide anchor 101.

Accordingly, in order to fit the tongue 104 into the buckle 103, the webbing W is withdrawn from the seat belt retractor 1 while being slid through an insertion hole of the guide anchor 101. Furthermore, in the case where the occupant fastens the seat belt or releases the seat belt to leave the vehicle, the webbing W is retracted due to operation of the spring unit 5 of the seat belt retractor 1 until a certain amount of load is applied to the webbing W.

The above-described seat belt apparatus 100 is made by applying the above-described seat belt retractor 1 according to the present embodiment to a typical seat belt apparatus for a front seat. However, the seat belt apparatus 100 may be applied to, for example, a rear seat with the guide anchor 101 omitted.

The present invention is not limited to the above-described embodiment. Of course, the present invention can be changed in various manners without departing from the gist of the present invention. For example, the present invention may be applied to a seat belt apparatus used for a conveyance other than the vehicle.

What is claimed is:

1. A seat belt retractor comprising: a spool that retracts a webbing that restrains an occupant; a base frame that accommodates the spool while allowing the spool to rotate; and a lock mechanism that regulates rotation of the spool,
    wherein the lock mechanism includes a locking base disposed at an end portion of the spool, an opening which is formed in the base frame and through which the locking base is inserted, engagement teeth formed at an inner edge of the opening, and a pawl that is disposed outwardly movable in a radial direction relative to the locking base and that is engageable with the engagement teeth,
    wherein the lock mechanism further includes a protect cover that includes a side wall portion disposed so as to cover a side portion of the locking base which faces to the engagement teeth a portion of the protect cover is inserted through the opening of the base frame, and,
    wherein, the protect cover is a separate member from the locking base and protects the side portion of the locking base so as not to contact with the engagement teeth of the base frame when the spool is moved with respect to the base frame and decentered; and wherein the protect cover includes a ceiling portion disposed on a surface of the locking base, and wherein the side wall portion is formed along an outer circumference of the ceiling portion.

2. The seat belt retractor according to claim 1, wherein the protect cover has a cut where the side wall portion is not disposed over a movable region of the pawl.

3. The seat belt retractor according to claim 1, wherein the ceiling portion has a securing hole that allows a projection formed on the locking base to be inserted therethrough.

4. The seat belt retractor according to claim 1, wherein the protect cover is formed of metal.

5. The seat belt retractor according to claim 1, wherein the locking base has a circular groove that allows a distal end of the side wall portion to be contained therein.

6. A seat belt apparatus comprising: a webbing that is configured to restrain an occupant; a seat belt retractor that retracts the webbing; a guide anchor that is disposed on a vehicle body side and that guides the webbing; a belt anchor that fixes the webbing to the vehicle body side; a buckle disposed on a side surface of a seat in which the occupant sits; and a tongue disposed in the webbing, the seat belt retractor is according to claim 1.

* * * * *